United States Patent [19]

Roscrow et al.

[11] Patent Number: 4,522,768
[45] Date of Patent: Jun. 11, 1985

[54] CASTING GASKET ASSEMBLY AND METHOD FOR CASTING LENSES THEREFROM

[75] Inventors: Harold N. Roscrow, North Adelaide; Ronald W. Ewer, Coromandel Valley; Philip H. Squires, Reynella, all of Australia

[73] Assignee: Sola Products Limited, Kowloon, Hong Kong

[21] Appl. No.: 139,210

[22] Filed: Apr. 11, 1980

[30] Foreign Application Priority Data

May 11, 1979 [CA] Canada .................................. 327467

[51] Int. Cl.$^3$ ............................................ B29D 11/00
[52] U.S. Cl. .................................. 264/2.2; 249/53 R; 249/82; 249/102; 249/134; 249/154; 425/808
[58] Field of Search ...................... 264/1, 1.1, 2.2, 2.3; 425/808; 249/102, 155, 159, 53 R, 82, 134, 154

[56] References Cited

U.S. PATENT DOCUMENTS

| | | | |
|---|---|---|---|
| 2,728,106 | 12/1955 | Herman et al. ...................... | 425/808 |
| 3,056,166 | 10/1962 | Weinberg . | |
| 3,222,432 | 12/1965 | Grandperret ........................... | 264/1 |
| 3,946,982 | 3/1976 | Calking et al. ...................... | 425/808 |
| 4,190,621 | 2/1980 | Greshes ............................... | 425/808 |
| 4,257,988 | 3/1981 | Matos et al. ......................... | 425/808 |

Primary Examiner—James Lowe
Attorney, Agent, or Firm—Harris Zimmerman; Howard Cohen

[57] ABSTRACT

A gasket assembly for casting optical lenses includes a first gasket member having a cylindrical opening therethrough and an annular flange extending radially inwardly in the cylindrical opening. One surface of the flange is adapted to receive a casting lens die, and may be disposed in a plane not perpendicular to the axis of the cylindrical opening. A second gasket member is adapted to be received in the first gasket member, and includes an inwardly extending annular flange having one surface adapted to mate with the flange of the first gasket member. The other side of the annular flange of the second gasket member includes a shaped surface adapted to receive a lens casting die having the capability of conferring on the cast lens any combination of power and cylinder characteristics, the shaped surface being configured to mate and seal with the peripheral area of the compound surface of the die. The gasket members may be mated together with the second gasket member rotatable in its mating arrangement with the first, so that a limited number of casting dies and gasket members may be used to cast lenses of any combination of sphere power, cylinder power, prism, and any other desired ophthalmic characteristics.

14 Claims, 11 Drawing Figures

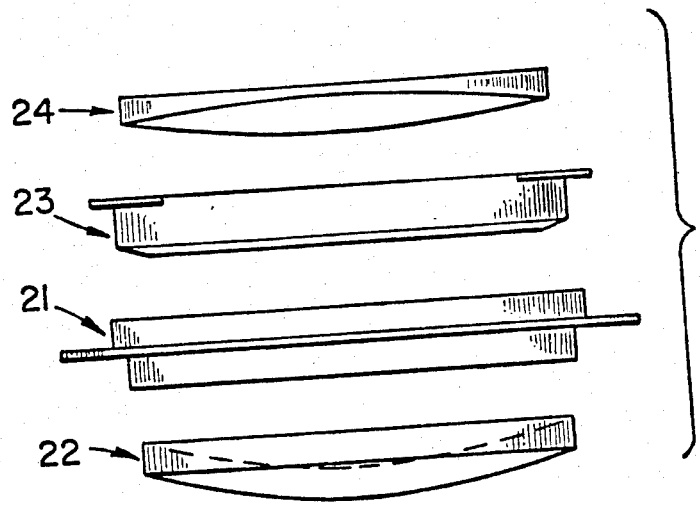
FIG_1
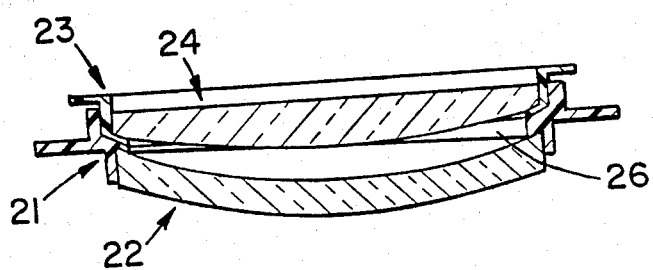
FIG_2
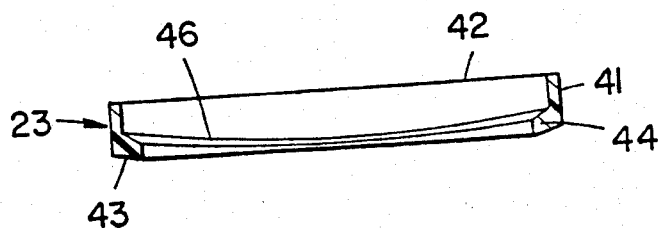
FIG_4
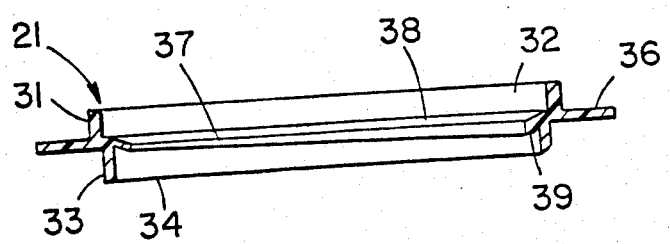
FIG_8

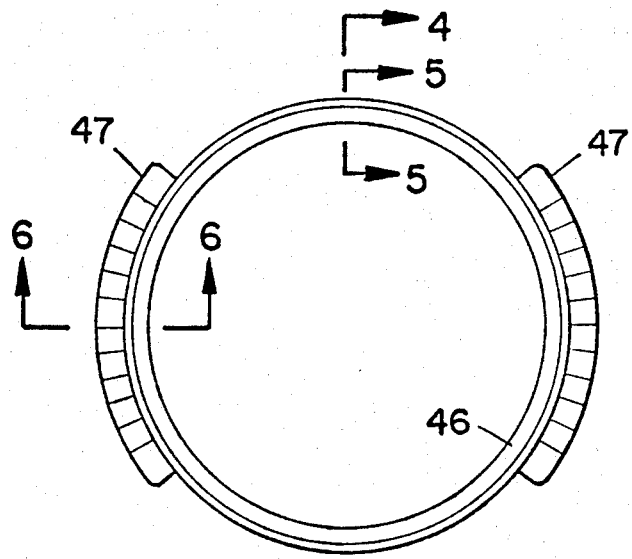
FIG_3
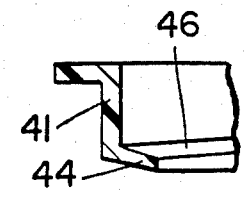
FIG_6
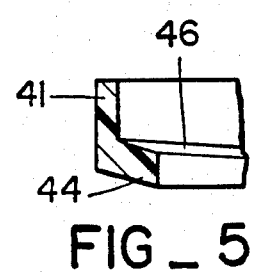
FIG_5
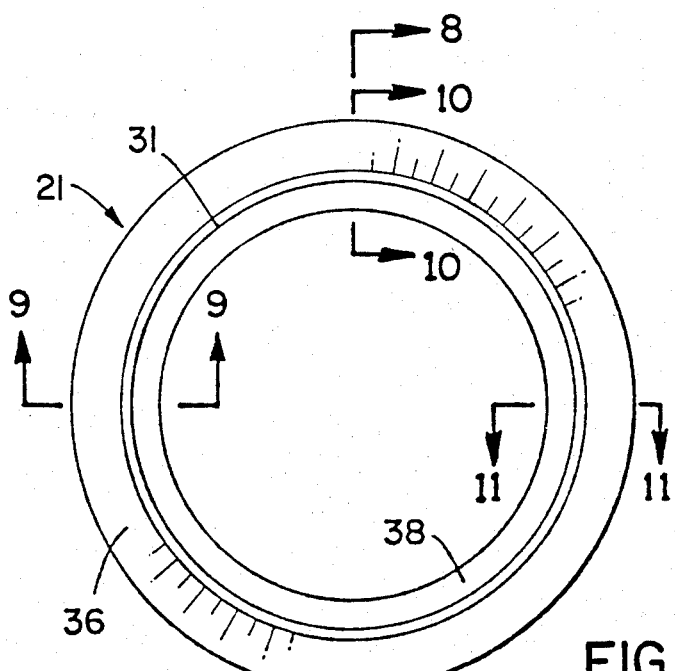
FIG_7
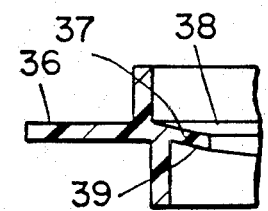
FIG_9
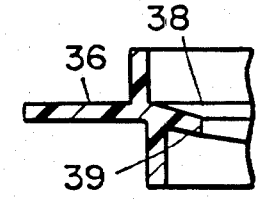
FIG_10
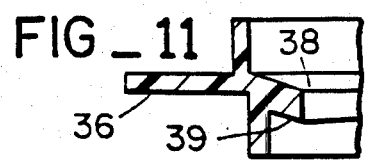
FIG_11

CASTING GASKET ASSEMBLY AND METHOD FOR CASTING LENSES THEREFROM

BACKGROUND OF THE INVENTION

In recent years, an increasing number of opthalmic lenses for the correction of ocular disorders have been fabricated by casting and curing a transparent plastic material, such as allyl diglycol carbonate monomer. These cast lenses are generally lighter than comparable glass lenses, and the casting process involves far less labor than the equivalent grinding and polishing process required for glass lenses.

Generally speaking, the lens casting process is carried out by means of a concave and convex die supported in spaced apart relationship by an optical casting gasket. The die surfaces determine the optical characteristics of the cast lens, and are accordingly prepared with great care and accuracy. As a result, the casting dies themselves represent a substantial expense.

There are a number of optical characteristics which must be carefully controlled in a lens to satisfy corrective ophthalmic requirements, generally comprising any one or more of the following: sphere power, cylinder power, cylinder axis orientation, reading segment type and location, prism power and direction, optical center location, diameter, and thickness. These characteristics each may vary over a wide range. To manufacture finished ophtalmic lenses which account for all the variations in all of the parameters is impractical. Indeed, even the manufacture of finished lenses which fulfill the most frequently prescribed corrective needs require an enormously large inventory.

Consequently, it is common practice to manufacture ophthalmic lenses as blanks, wherein one surface is cast with a general corrective curvature and the other surface is subsequently ground and polished to meet the particular corrective requirements. The grinding and polishing procedures required to finish the blanks are time consuming and expensive, whereas the cost of casting the blanks is rather low. By comparison, were it possible to cast plastic lenses in finished form, the manufacturing cost per lens would be quite low. However, finish casting of plastic lenses is merely an ideal in the state of the art, due to the enormous number of casting gaskets and lens casting dies that would be required to produce the range of frequently prescribed corrective lenses.

Previous proposals have been made for lens casting assemblies in which attempts have been made to avoid or minimize the problems referred to above. Such proposals include, e.g., U.S. Pat. No. 3,946,982 in the name of Calkins et al., and U.S. Pat. No. 3,056,166 in the name of J. W. Weinberg; both these specifications still involve the use of many different types of gasket. In the case of U.S. Pat. No. 3,056,166 a fresh gasket is cut from a pre-form each time, and U.S. Pat. No. 3,946,982 while reducing the number of individual gaskets required, still requires a substantial number. In both cases, problems would be expected in preventing leakage of casting material out of the assembly due to the nature of the gaskets and the way the assembly is formed.

SUMMARY OF THE PRESENT INVENTION

The present invention generally comprises a gasket assembly for casting plastic lenses. It is distinguished from similar prior art devices in that it is capable of casting, in finished form, lenses having virtually any combination of optical characteristics, using a limited number of casting dies and gasket members.

The lens casting gasket assembly of the present invention comprises a first gasket member having a central passage therein, one end of said passage including first means to receive one of said dies in mating relationship, a second gasket member having a second central passge therein, a portion of said central passage including second means to receive the other of said dies in mating relationship, said gasket members including means for joining said gasket members together in mating, sealing relationship, said dies being disposed in confronting, spaced relationship, said dies and gasket members defining a lens casting cavity.

The first gasket member has a generally cylindrical configuration and may include an external flange extending radially outwardly therefrom. An internal flange extends radially inwardly into a cylindrical opening in the gasket. One surface of the interior flange is adapted to receive and form a seal with a concave lens casting die. This flange surface may be disposed in a plane which is not perpendicular to the longitudinal axis of the gasket, so that a prism characteristic may be imparted to the cast lens. The other surface of the interior flange is beveled, and is generally disposed in a plane orthogonal to the longitudinal axis of the gasket. This arrangement may be reversed, i.e., the flange surface forming a seam with the concave lens casting die may be disposed in a plane perpendicular to the longitudinal axis of the gasket, and the beveled surface in a non-perpendicular plane.

The assembly includes a second gasket member which also has a generally cylindrical configuration with a cylindrical opening therethrough. The second gasket member also includes an inwardly extending annular flange at one end thereof, one surface thereof being beveled to mate and seal with the beveled surface of the interior flange of the first gasket member. Both beveled surfaces are inclined at an angle so that the first gasket member engages the peripheral edge portion of the concave casting die. The other surface of the inwardly extending flange of the second gasket member comprises a shaped surface which is adapted to receive and form a seal with the peripheral edge portion of a convex lens casting die having any combination of sphere and cylinder corrective characteristics.

A salient feature of the present invention is that the second gasket member may be located with respect to the first gasket member, while maintaining the desired spacing between the lens casting dies. Our preferred arrangement is one in which the second gasket member is rotatable with respect to the first gasket member. In casting a lens having a cylinder correction it is necessary to orient the convex casting die with respect to the prism axis and the location of the multifocal segment when required. By appropriate location of the second gasket member within the first gasket member such orientation is achieved so that when the convex casting die is placed in the second gasket member it is correctly oriented with respect to the concave casting die. The concave die received by the first gasket member may contain certain multifocal segments, such as any form of bifocal or trifocal segments, or the like, and may also be rotated with respect to the first gasket member. Thus, the concave lens casting die may be oriented to place correctly the multifocal segments with respect to the prism axis. Also, the second gasket member permits rotation of the convex casting die to orient properly the cylinder axis with respect to the prism axis, and when required, the location of the multifocal segment. These angular adjustments can be facilitated by angle indicating indicia provided on the exterior surface or exterior flange of the first gasket member, and indicia provided on the second gasket member to enable it to be located accurately. The second gasket member may include tabs extending therefrom bearing these indicia.

The method of employing the gasket assembly of the present invention comprises the steps of placing one of said dies in a first gasket member, locating said one die to the desired angular orientation with respect to said first gasket member, providing a second gasket member adapted to receive the other die, assembling said gasket members so as to be able to orient properly said other die with respect to one die, inserting said other die in said second gasket member in a predetermined angular orientation therewith, and in confronting relationship with said one die, introducing a casting composition between said confronting die surfaces, and curing said casting composition to form a lens. The main component of the casting composition is a polymerisable or curable monomer such as allyl diglycol carbonate. The composition will also contain a catalyst to accelerate the curing action and may include additives to assist mold release and stabilize the finished lenses in the presence of U.V. light to absorb ultraviolet-visible or infrared radiation.

A BRIEF DESCRIPTION OF THE DRAWINGS

FIG. 1 is an exploded view of the lens casting gasket assembly of the present invention.

FIG. 2 is a cross-sectional elevation of the gasket assembly, shown in its assembled disposition.

FIG. 3 is a plan view of one of the gasket members of the present invention.

FIG. 4 is a cross-sectional view of one of the gasket members, taken along line 4—4 of FIG. 3.

FIG. 5 is an enlarged cross-sectional view taken along line 5—5 of FIG. 3.

FIG. 6 is an enlarged cross-sectional view taken along line 6—6 of FIG. 3.

FIG. 7 is a plan view of the other gasket member of the present invention.

FIG. 8 is a cross-sectional view of the gasket member shown in FIG. 7, taken along line 8—8 of FIG. 7.

FIG. 9 is an enlarged cross-sectional view taken along line 9—9 of FIG. 7.

FIG. 10 is an enlarged cross-sectional view taken along line 10—10 of FIG. 7.

FIG. 11 is an enlarged cross-sectional view taken along line 11—11 of FIG. 7.

DESCRIPTION OF THE PREFERRED EMBODIMENT

The present invention generally comprises a lens casting gasket assembly which is capable of casting in finished form optical lenses having virtually any combination of optical characteristics, including sphere power, cylinder power and axis, prism power and axis, multifocal segments, optical center location, and thickness. As shown in FIG. 1, the gasket assembly includes a gasket member 21 which receives a concave lens casting die 22, and another gasket member 23 which receives a convex lens casting die 24. As shown in FIG. 2, the gasket member 23 is adapted to be received by the gasket member 21 in a co-axial assembly, the dies 22 and 24 being retained with a predetermined spacing therebetween to form a chamber 26 in which the casting composition is cast to form a finished lens. Each die is received in its respective gasket member in a sealing engagement with the peripheral edge portion of each die, the seal extending continuously about the circumference of the die.

With reference to FIGS. 7 and 8, the gasket member 21 includes an upper cylindrical portion 31 having a cylindrical opening 32 extending axially therethrough. A lower cylindrical portion 33 is disposed concentrically with respect to the upper portion 31 and includes a cylindrical opening 34 which is also co-axial with respect to the opening 32. In the preferred embodiment the lower cylindrical portion 33 is significantly less in diameter than the upper portion 31, and the opening 34 is likewise proportioned to the opening 32, as shown in FIG. 8.

Extending outwardly from the gasket member 21 is a radially extending flange 36 which extends continuously about the gasket member. As shown in FIG. 7, the flange 36 is provided with indicia which indicate angular settings which can be used in conjunction with the gasket member 23. The use of these indicia will be explained in the following description. Alternatively, the external flange may be omitted, and the indicia may be placed on an upper or outer surface of the gasket member 21.

The gasket member 21 also includes a flange 37 extending radially inwardly into the opening 32 and 34, and positioned axially at the juncture of the upper and lower cylindrical portions 31 and 33. The flange 37 includes an upper annular surface 38 which is beveled slightly and which extends inwards towards the longitudinal axis of the gasket member. The lines formed by the intersection of the surface 38 and the inner surface of opening 32, and the inner edge of surface 38 both lie in planes which are perpendicular to the axis of the gasket member 21.

The flange 37 also includes a lower annular surface 39. The line defined by the intersection of the surface 39 with the inner surface of the opening 34, and the inner edge of the surface 39 both lie in planes which are parallel to each other and are offset from a plane which is perpendicular to the longitudinal axis of the gasket 21. Thus the surface 39 is also offset from the surface 38, as evidenced by the varying thickness of the flange 37, as shown in FIGS. 8 and 9-11. The angular offset of surface 39 with respect to a plane perpendicular to the longitudinal axis of the gasket determines that the casting die 22 will be disposed at the same offset angle, so that a desired amount of prism will be introduced to the lens being cast in the cavity 26. Of course, the present invention encompasses the provision of several casting gaskets 21, each having different offset angles between the surfaces 39 and 38. Thus the desired amount of prism, including no prism at all (zero offset angle) may be introduced into the cast lens by selecting the correct gasket member 21.

It should also be noted that the surface 39 is provided with a bevel which is continuous and uniform throughout its extent, as shown in FIGS. 9-11. The bevel is inclined at an angle so as to engage the peripheral edge portion of the die 22 in continuous fashion to effect a seal therewith.

It should be noted that the opening 34 is substantially equal in diameter to the diameter of the casting die 22. Also, it should be noted that the die 22 may be secured in the opening 34 at any rotational angle about the longitudinal axis of the gasket member 21. Thus, for example, any multifocal segment which is present in the concave surface of the die 22 may be oriented independently with respect to the prism angle provided by the offset of the surface 39.

With reference to FIGS. 3 and 4, the gasket member 23 includes a generally cylindrical portion 41 having a cylindrical opening 42 extending co-axially therethrough. The diameter of the cylindrical portion 41 is substantially equal to the diameter of the opening 32 of the member 21. Also, the lower edge of the gasket member 23 is provided with an annular beveled portion 43 which is adapted to mate with the beveled surface 38. Thus the gasket member 23 may be received within the opening 32 of the gasket member 21.

At the lower end of the cylindrical portion 41 a flange 44 extends radially inwardly into the opening 42. The upper annular surface 46 of the flange 44 is configured to engage the peripheral edge portion of the convex surface of the casting die 24. Due to the fact that the convex surface of the die 24 may incorporate both sphere and cylinder characteristics, the surface 46 is provided with a shape which mates with the peripheral area of the convex surface of the die 24. In the situation, therefore, where there are both cylinder and sphere characteristics to be imparted to the finished lens, i.e., a toroidal surface having a pair of diametrically opposed low spots, a pair of diametrically opposed high spots and a smoothly inclined surface therebetween. FIG. 6 depicts a cross-section of the gasket member 23, taken through one of the low spots of the surface 46. FIG. 5 is a cross-section of the same member, taken through one of the high spots of the surface 46. When the final lens provides a sphere correction, the flange 44 is arranged to give a substantially uniform separation between surfaces 43 and 46.

The invention includes a plurality of gasket members having surfaces 46 which correspond to, mate with, and form a seal with die members 24 having differing combinations of sphere and cylinder corrections. Also, the die 24 may provide no cylinder correction, and the set of gasket members 23 includes those having surfaces 46 to accommodate such cases.

The gasket member 23 receives the die 24 in a fixed angular relationship with respect to the cylinder axis of the gasket member. However, the gasket member 23 is adapted to be received in the gasket member 21 at any desired angular mating relationship therebetween. Thus the axis of any cylinder correction provided by the die 24 may be oriented as required with respect to the prism angle of the surface 39 and with respect to any multifocal segment of the die 22 which may be present. It should be noted that the gasket member 23 in our preferred embodiment is rotatable in its engagement in gasket member 21. However, the insertion of die 24 in gasket 23 expands the gasket 23 slightly and causes it frictionally to lock in place in the gasket member 21.

To facilitate the proper angular orientation of the die members, a pair of tabular members 47 extend radially outwardly from the cylindrical portion 41, and are disposed in diametrically opposed relationship. If desired, the tabular members may be replaced by a rim extending radially from and continuously about the cylindrical portion 41. Either the rim or the tabular portions have indicia to indicate the axis of the low points in the case where a cylinder correction is needed. Vernier markings may also be provided on the rim or tab. The indicia and vernier markings are employed in conjunction with the indicia on the flange 36 of the gasket member 21, so that the desired angular orientation between the gasket members and the die members easily may be effected. Alternatively, the tabular portions 47 may be omitted and indicia indicating the axis of the two low points may be placed on the upper surface of the gasket member 23.

To employ the assembly of the present invention to cast a multifocal lens which has a sphere and cylinder correction, the lens casting dies 22 and 24 are first selected to provide the required multifocal segment (bifocal, trifocal, etc), and the required spherical and cylindrical corrections. Also, the proper gasket 21 is selected to provide the desired prism, if any. The proper gasket member 23 is selected so that the surface 46 thereof will mate with the selected die 24 in a sealing relationship.

The casting die 22 is then inserted in the opening 34 of the gasket 21, impinging on the surface 39, and is oriented so that the multifocal segment of the die is correctly positioned with respect to the prism axis. The gasket member 23 is then inserted in the opening 32 of the gasket member 21 and is aligned so that the axis of the cylinder correction of die 24 will be disposed at the proper angle with respect to the prism determined by the surface 39 and with respect to the multifocal segment of the die 22. Next, the casting die 24 is inserted in the opening 42 of the gasket member 23, with the thick edge portions of the die aligned with the midpoints of the tabular portions 47. This alignment step may be carried out by visually aligning the center points of the tabular portions 47 with a line or other indicia on the die 24 which indicates the axis of the cylinder correction embodied therein.

The assembly is then clamped together by any prior art clamping device, and casting composition is introduced into the cavity 26. The assembly is then held at such a temperature and for such a time as to cure the composition and yield a finished lens.

Due to the fact that the gasket members 21 and 23 are formed from a flexible, form-retaining plastic substance, the assembly may easily be disassembled after the polymerization process is completed.

EXAMPLE 1

Prescriptions for lenses are given as an expression such as: $Rx = +2.00/-1.00 \times 60$ degrees. This represents a single vision lens with a sphere power of +2.00 diopters, a cylinder power of −1.00 diopter, and a sixty degree axis for the cylinder. In order to manufacture a lens to this description by the method of the present invention, using the casting gasket assembly of the present invention, it is necessary to select the appropriate dies and gaskets. The dies are shaped to allow for the shrinkage that occurs during curing of the casting composition. Such shrinkage in the case of casting compositions based on allyl diglycol carbonate is of the order of 14%. The dies are, however, referred to in terms of the requirements of the prescription rather than of their exact shape and will be referred to in this manner here. In the present case the concave die 22 is selected to give the sphere power of +2.00 and the convex die 24 to give the cylinder power of −1.00. The convex die 24 is selected by reference to the spherical correction of the concave die of +2.00. A chart is prepared showing this correlation, and reference to this chart shows for a spherical correction of +2.00, the convex die should have a base curve of +5.00. A convex die 24 with a base curve of +5.00 and resultant cylinder power of −1.00 is then selected. The cylinder power is the differential between the base curve and the power or cross curve. There is no prism required, so the gasket member 21 is selected both to have no prism and to have a mating surface for a concave die 22 which is shaped to give a sphere power of +2.00. A chart can be prepared indicating the appropriate gasket to be selected for a particular sphere power and prism (including the no prism cases). A gasket member 23 is selected using a further chart to mate with the convex die 24.

After the dies and gaskets are selected, the concave die 22 is inserted in the gasket 21 and gasket 23 inserted in gasket 21. Gasket 23 is inserted in gasket 21 and oriented by means of the indicia on the respective gaskets so that when convex die 24 is inserted in gasket 23, the cylinder axis of the finished lens will be at sixty degrees to the horizontal axis of the frame into which it is subsequently fitted. Die 24 is inserted in gasket 23, the assembly is clamped together, and the cavity 26 is filled with a casting composition which is primarily allyl diglycol carbonate. The composition is then cured by placing the assembly in a curing oven. Once curing has been completed, the assembly is taken apart and the lens removed. The lens is then ready to be checked for compliance with the prescription.

EXAMPLE 2

A further example of a single vision lens prescription is: $Rx=+2.00/-1.00\times 60$ degree O.D. 1 degree base in.

It will be noted that the only difference from Example 1 is the use of the phrase "1 degree base in" and "O.D." O.D. indicates the right eye, and the other expression is one way of expressing the need to have a prism correction of 1 prism diopter. In order to case a lens to this prescription, all of the steps of Example 1 are carried out except that the gasket 21 is selected by means of a chart to give the 1 prism diopter value to the finished lens, i.e., the thickness variation of the internal flange on the gasket produces this quantity of prism. The thickest part of the lens is beside the nasal side, with the apex of the prism at 180 degrees and the base of the prism at zero degrees. The gaskets may be conveniently made in ¼ prism diopter steps.

EXAMPLE 3

This example illustrates the steps in making a multifocal lens of the round segment bifocal type without prism. An example of a prescription for this type is: $Rx=+2.00/-1.00\times 60$ degree O.D. 225 ADD.

This expression only differs from Example 1 in the use of the expression "O.D. 225 ADD." O.D. is an abbreviation indicating the right eye. 225 ADD. defines the difference between the near and distance vision spherical power. Apart from the selection of the die 22 which contains the round segment near vision segment, all the steps are the same as in Example 1.

Die 22 in this case will have a distant vision spherical power of +2.00, and a near vision spherical power of +4.25 with both parts having a cylinder power of −1.00 (obtained in the same manner as Example 1).

An additional step required in this case is that the bifocal segment in die 22 and the cylinder axis of die 24 must be also oriented in the manner described in the specification.

EXAMPLE 4

Another common variation of multifocal lens is one with a flat top which unlike Example 3 needs a prism correction. An example of such a prescription is: $Rx=+2.00/-1.00\times 60$ degree 0.75 prism diopter base out O.D. 300 ADD.

In this case the steps followed are the same as Example 2 with respect to gasket selection and the same as Example 3 as regards die selection except, of course, that die 22 is selected with a flat top segment rather than a round segment. The assembly of the lens casting assembly is carried out in the same manner as Example 3 except that the bifocal segment in die 22 must be oriented properly with respect to gasket 21 prior to the subsequent steps.

We claim:

1. A method of casting an optical lens with a pair of dies having curved casting surfaces, comprising the steps of placing one of said dies in a first gasket member, locating said first die at the desired angular orientation with respect to said first gasket member, providing a second gasket member adapted to receive the other die, assembling said gasket members so as to be able to orient properly said other die with respect to said first die, inserting said other die in said second gasket member in a predetermined angular orientation therewith and in confronting relationship with said first die, introducing a non-form-retaining optical casting composition between said confronting die surfaces and curing said casting composition to form a lens.

2. The method of claim 1, wherein the step of inserting said other die in said second gasket member also serves to cause said gasket members to mutually engage in a frictional, non-rotating manner.

3. A method of forming a lens from a liquid casting composition by placing the liquid in a cavity formed between two mold parts held in a gasket having an internal flange, and thereafter curing the polymer, comprising the steps of:
   (a) Positioning a mold part having a concave surface in sealing contact with a first gasket member and with that concave surface in a pre-determined axial orientation with respect to the internal flange of said first gasket member,
   (b) Placing a second gasket member having an internal flange adapted to receive the peripheral edge portion of the convex surface of the second die, in mating relationship with the first gasket member so that it is locatable relative to the first gasket member and the concave surface of the mold part mounted in that first gasket member, the flange of the first gasket member mating with the flange of the second gasket member thereby to form an internal flange between the die members,
   (c) Locating said second gasket member relative to said concave surface of said first mold part so that when the second mold part is placed in a predetermined position within the second gasket member there is a predetermined spacial relationship between the two mold parts,
   (d) Placing the second mold part in the second gasket member in its predetermined position with its convex surface facing the concave surface of the other mold part, the dimensions of the second mold part being such that the second gasket member is placed into a sealing relationship with the first gasket member and is no longer rotatable relative to said member, (e) Holding said mold parts in contact with the internal flange formed by the flanges of the two gasket members, (f) And filling the cavity formed between the mold parts with the casting composition, placing the assembly in a curing oven, curing, and then removing the mold parts and gaskets from the cured composition thereby to provide the lens.

4. A lens casting gasket assembly for casting lenses between two dies, one having a spherical molding surface and the other having a toroidal molding surface, comprising a first gasket member having a first central passage therein, one end of said passage including first means to receive said one of said dies in mating relationship, said first means including means for introducing prism into said lens, a second gasket member having a central passage therein, a portion of said central passage including second means to receive said other of said dies in mating relationship, means for joining said gasket members together with said dies disposed in confronting, spaced relationship, said dies and gasket members defining a closed lens casting cavity, means for selectively varying the axis of said toroidal molding surface, including means for joining said gasket members in mating relationship at an angle about the axis of said central passage.

5. The lens casting gasket assembly of claim 4, wherein said first central passage has a longitudinal axis, and said first means includes means for securing said one of said dies in a plane non-orthogonal to said axis.

6. The lens casting gasket assembly of claim 5, wherein said last mentioned means includes an annular surface adjacent to said first central passage, said annular surface being disposed in a plane non-orthogonal to said axis and adapted to impinge on the periphery of said first die.

7. The lens casting gasket assembly of claim 6, further including a plurality of said first gasket members having said annular surfaces disposed in planes at differing angles with respect to said axis.

8. The lens casting gasket assembly of claim 4, wherein the other end of said first passage is adapted to receive a portion of said second gasket member with said central passages in confronting alignment.

9. The lens casting gasket assembly of claim 8, wherein said first passage includes a longitudinal axis, and said second gasket member is received in rotatable fashion about said axis by said first gasket member.

10. The lens casting gasket assembly of claim 9, wherein said first gasket member includes indicia thereabout indicating angular increments about said axis.

11. The lens casting gasket assembly of claim 10, wherein said second gasket member also includes angular orientation markings thereon, said markings and said indicia being disposed in adjacent juxtaposition.

12. The lens casting gasket assembly of claim 4, wherein said second central passage includes an annular flange therein for mating with the periperhy of said toroidal surface in sealing fashion.

13. The lens casting gasket assembly of claim 12, wherein said one die is rotatably received by said first gasket member, and said second gasket member is rotatably received by said first gasket member.

14. The lens casting gasket assembly of claim 12, further including a plurality of second gasket members having said annular flanges in an array of configurations each adapted to mate with a second die having a differing casting surface.

* * * * *